United States Patent [19]

Takenoya et al.

[11] Patent Number: 4,522,137

[45] Date of Patent: Jun. 11, 1985

[54] METHOD OF PRODUCING STITCH PATTERNS IN AN ELECTRONIC SEWING MACHINE

[75] Inventors: Hideaki Takenoya, Hachioji; Toshiro Fujimura, Musashino; Masanori Hara; Yoshinobu Tonomura, both of Hachioji, all of Japan

[73] Assignee: Janome Sewing Machine Co. Ltd., Tokyo, Japan

[21] Appl. No.: 281,895

[22] Filed: Jul. 9, 1981

Related U.S. Application Data

[63] Continuation of Ser. No. 70,048, Aug. 27, 1979, abandoned.

[30] Foreign Application Priority Data

Aug. 29, 1978 [JP] Japan ................................ 53-104363

[51] Int. Cl.³ .............................................. D05B 3/02
[52] U.S. Cl. .................................. 112/266.1; 112/453
[58] Field of Search ............ 112/158 E, 262.1, 121.11, 112/121.12, 266.1; 318/567, 568

[56] References Cited

U.S. PATENT DOCUMENTS

| | | | |
|---|---|---|---|
| 4,122,786 | 10/1978 | Tanimoto et al. | 112/158 E |
| 4,142,473 | 3/1979 | Itoh | 112/158 E |
| 4,280,424 | 7/1981 | Carbonato et al. | 112/158 E |
| 4,373,459 | 2/1983 | Dunn et al. | 112/158 E |
| 4,399,760 | 8/1983 | Bergvall | 112/158 E |
| 4,457,246 | 7/1984 | Hanyu et al. | 112/158 E X |

Primary Examiner—Peter Nerbun
Attorney, Agent, or Firm—Michael J. Striker

[57] ABSTRACT

A method is disclosed in which all patterns to be sewn by an electronic sewing machine are divided into individual unit patterns. Stitch data characteristic of common unit patterns which find application in more than one pattern to be sewn is stored only once in a read-only memory. As a result, wasted space in a read-only memory caused by unnecessary repeated storage of the same stitch data pertaining to common unit patterns is eliminated. This method makes it possible to store more patterns within a read-only memory of a given size and further enables more complicated patterns to be sewn.

3 Claims, 13 Drawing Figures

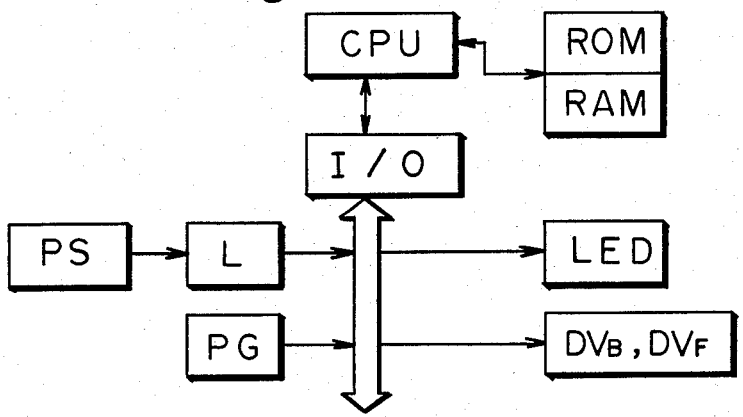

Fig. 2

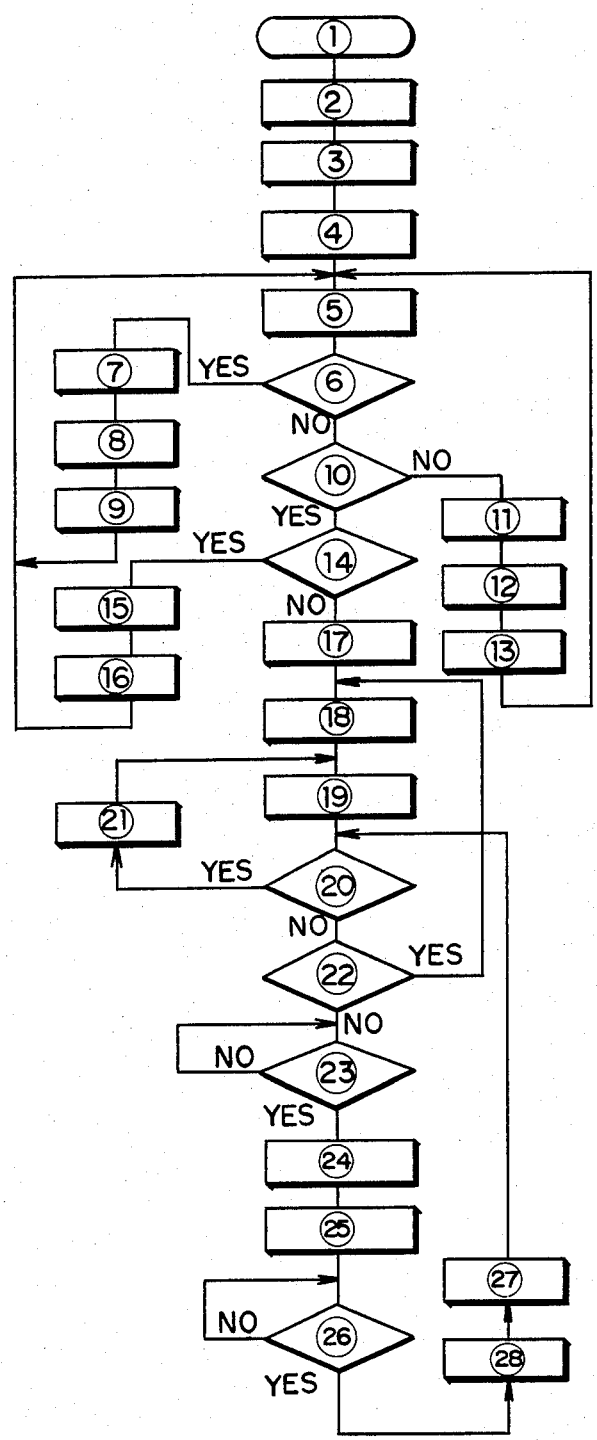

① Start
② Flag NX = 0
③ Key, Reading - Out
④ Designation & Memorization of initial address
⑤ Reading-Out of contents of initial address
⑥ Is this A - Region ?
⑦ Y = Initial address
⑧ Initial address = Contents of initial address
⑨ Flag NX = 1
⑩ RET ?
⑪ Mn ← Contents of initial address
⑫ n = n + 1
⑬ Initial address = Initial address + 1
⑭ Flag NX = 1 ?
⑮ Initial address = Y + 1
⑯ Flag NX = 0
⑰ Mn ← RET
⑱ Designation of n
⑲ Memorization of contents of Mn
⑳ RET' ?
㉑ n = n + 1
㉒ RET ?
㉓ Needle swing phase ?
㉔ DV$_B$ Output
㉕ N = N + 1
㉖ Feeding phase ?
㉗ N = N + 1
㉘ DV$_F$ Output

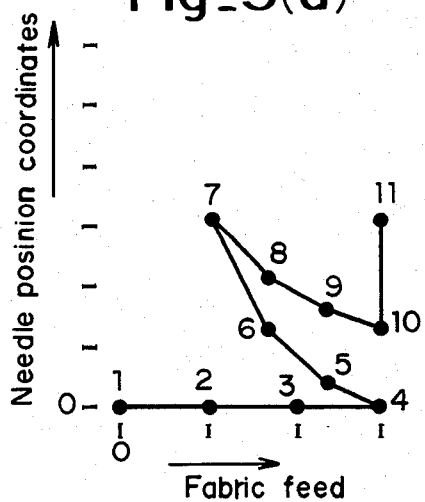
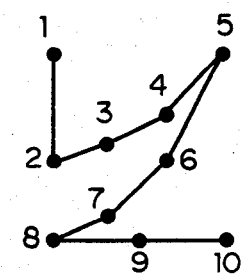
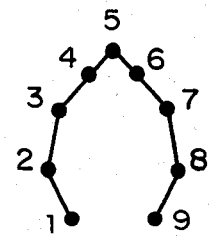
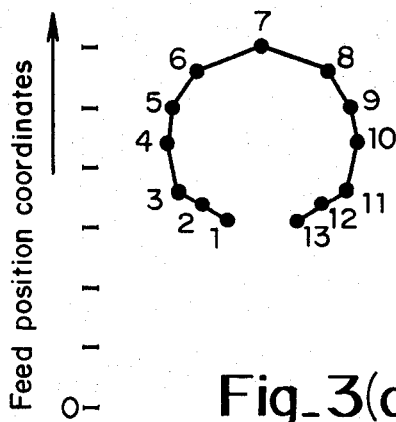
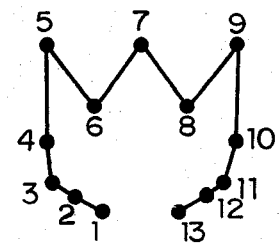
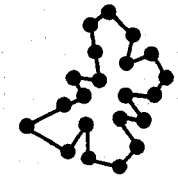
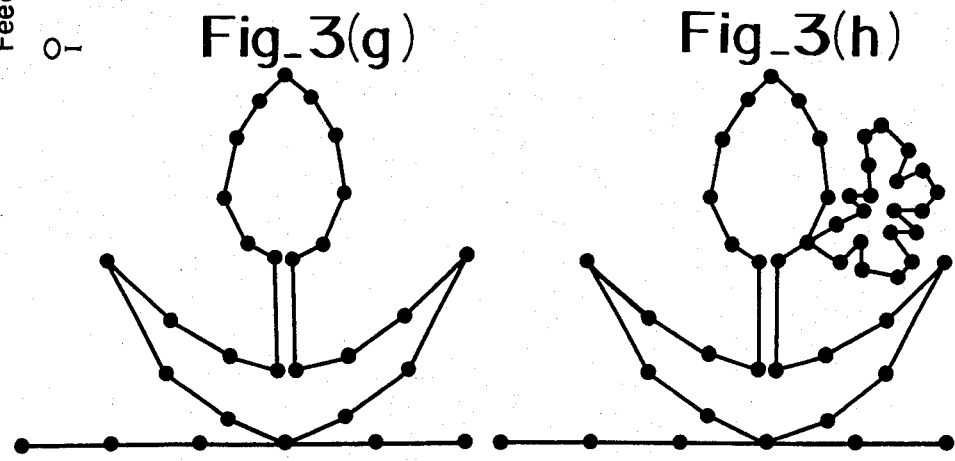

METHOD OF PRODUCING STITCH PATTERNS IN AN ELECTRONIC SEWING MACHINE

This is a continuation of application Ser. No. 070,048, filed Aug. 27, 1979, now abandoned.

BACKGROUND OF THE INVENTION

1. Field of the Invention

This invention reduces wasted memory in a sewing machine to enable more stitch data to be stored in a smaller memory.

2. Description of the Prior Art

In a conventional electronic sewing machine which stores stitch data in an electronic memory to produce stitch patterns, and the data are stored in groups, with each group corresponding to one of the patterns. Therefore, even if stitches common to more than one pattern are present, corresponding data are all repeatedly stored in different positions in the memory. This is a waste of memory space.

SUMMARY OF THE INVENTION

The present invention has been devised to eliminate this defect of the prior art. It is a primary object of the invention to make it possible to store more stitch data in a smaller memory.

It is another object of the invention to divide the stitch groups in a specific pattern into a predetermined number of units so that such stitch units may be utilized in a wider scope of patterns.

These objects, among others which will appear hereinafter, are achieved by storing stitch data relating to stitches which are common to more than one pattern only once, rather than repeatedly, for use as required. This saves memory space, and allows a greater number of patterns to be produced.

The other features and advantages of the invention will be apparent from the following description of the invention with reference to the preferred embodiment as shown in the attached drawings.

BRIEF DESCRIPTION OF THE DRAWING

FIG. 1 is a block diagram of the control system in a sewing machine according to the invention;

FIG. 2 is a flow chart for explaining the operation of the control system;

FIGS. 3a-h are pattern examples;

FIGS. 4 and 6 show the relationship between addresses in RAM and the contents thereof; and FIG. 5 shows the relationship between the addresses in ROM and the contents thereof.

DESCRIPTION OF THE PREFERRED EMBODIMENTS

In FIG. 1, ROM is a read-only memory which stores stitch data associated with stitch patterns in first groups and second groups. First groups contain stitch data for stitches used in at least two patterns, and second groups contain stitch data for stitches not so used. ROM further stores program control signals for carrying out later-mentioned programs. CPU is a central processing unit for executing each of the programs. RAM is a random access memory which temporarily stores a process or a result of each program. I/C is an input-output port. PS is a pattern selector which, when a desired pattern is selected by user's operation of a pattern selecting switch (not shown) on a sewing machine (not shown), latches appropriate information into latch circuit L, which transfers it to central processing unit CPU. PG is a pulse generator which is synchronized with rotation of an upper shaft (not shown) of the sewing machine, and is thus synchronized with vertical movement of a needle bar (not shown). Pulse generator P6 issues pulses at fixed phases (here, the upper dead point and lower dead point of the needle bar) and delivers these pulses to central processing unit CPU so as to read out stitch data stored in read-only memory ROM. LED is a display, and when a pattern is selected by pattern selector PS, central processing unit CPU lights a corresponding light-emitting diode (not shown) in display LED to indicate that pattern selection has taken place. DV is an electric driver for controlling needle swing amplitude and fabric feed, and is usually composed of an electromagnetic device such as a servo-motor and a driving circuit. Driver DV is controlled by stitching signals from central processing unit CPU, which combines some stitch data groups in read-only memory ROM in response to the patterns selected, and which reads out the combined signals from read-only memory ROM in a required sequence.

An explanation of the operation of central processing unit CPU will take place with reference to the flow chart shown in FIG. 2 and the pattern examples in FIG. 3. When a power source (not shown) is turned on, a program is started. A flag (or discriminating signal) NX determines if a part of a pattern (such as is shown in FIG. 3-g) is a complete pattern such as is shown in FIG. 3-f (called an A region hereinafter) or is an incomplete pattern such as one shown in FIGS. 3-a–e (called a B region hereinafter). Flag NX is logically high if the pattern is complete, or an A pattern, and is logically low if the pattern is incomplete, or a B pattern. In order to ascertain which pattern has been selected by operation of pattern selector PS, a key matrix (Key) is read out where the pattern selected requires a specific combination of patterns. Then, this combination (namely, the initial address specific to the selected pattern) is designated and is temporarily stored, and its contents (at this initial address) are read out. Namely, assuming as an example that the pattern shown in FIG. 3-g is selected, the initial address designation is an initial address containing stitch data pertaining to repeating signal RET of FIGS. 3-a, b, c, and stitch data representing unit pattern (a) is first read out. As this corresponds to a B pattern and is not a repeating signal RET, the stitch data of (a) stored at the initial address is stored at an appropriate location (Mn) in RAM. Then, stitch data of (c) at an address immediately following the initial address is read out and is stored at location (Mn+1) in RAM. When stitch data of (b) is read out and is stored at RAM location (Mn+2), the stitch data stored at the next address is the repeating signal RET and flag NX is low. Therefore, repeating signal RET is stored at location (MN+3) in RAM. Thus, the table shown in FIG. 4 is created. Stitch data of (a) at location (Mn) in RAM is then stored for subsequent read-out. Stitch data of (a) corresponds to the data controlling needle swing amplitude for producing the first stitching signal 1 in FIG. 3-a. Assume the data to be "a1". Read-only memory ROM stores, as shown in FIG. 5, needle swing amplitude data and fabric feed data alternately with respect to the unit pattern (a) as the initial address of said data (a1). It also stores a repeating signal RET' last. When the initial needle swing amplitude data is read out, it activates needle-swing drive mechanism $DV_B$ upon receipt of a pulse from pulse generator P6, which pulse is issued when the needle is positioned at its upper dead point. Then, N (which is the address of stitch data common to unit patterns a-3) is increased by 1, and the fabric feed data for stitching signal 2 is read out to activate the fabric-feed drive mechanism $DV_F$ when the needle is positioned at its lower dead point. Thus, address N is successively incremented by 1 so as to alternately control needle swing amplitude and fabric feed. When repeating signal RET' is reached, the stitch data of (c) at RAM address (Mn+1) in FIG. 4 is read out. Although stitch data of (c) is not shown there, this stitch data contains that needle swing amplitude data and that fabric feed data (alternately stored in ROM) which will create unit pattern (c). The initial address will contain data for needle swing amplitude (designated by $c_1$) of the stitch No. 1 in FIG. 3-c, and the last address will contain repeating signal RET' in the same manner as in unit pattern (a). The unit pattern (c) is read out in the same fashion as shown in FIG. 5, and the stitches to unit pattern (c) are successively formed. Finally, when repeating signal RET' is reached, unit pattern (b) is read out. When the stitch data of unit pattern part (b) are all read out, the pattern shown in FIG. 3-g is completed. When repeating signal RET' is read out, data at RAM location (Mn+3) in FIG. 4 is read out. Since this data is repeating signal RET, the stitch data of (a) at RAM location (Mn) is read once more, and the pattern in FIG. 3-g is repeatedly formed. The stitch data of (c) in FIG. 4 may be replaced by stitch data of the pattern in FIG. 3-d or 3-e, to produce different patterns by the same method.

In this connection, it is possible to produce a pattern such as is shown in FIG. 3-h by a combination of the pattern in FIGS. 3-f and 3-g. The pattern in FIG. 3-f is complete in itself and may be divided into unit patterns. Assume that the pattern in FIG. 3-f is composed of unit patterns (i) and (j), though they are not shown. The initial address in RAM contains repeating signal RET of the patterns shown in FIGS. 3-a, 3-c, 3-f, and 3-b, and stitch data representing unit patterns (a) and (c) are read out in the same fashion as mentioned above and are stored at addresses (Mn) and (Mn+1) of RAM, while stitch data representing pattern (f) is read out. Since pattern (f) is an A-region, its initial address, i.e., location (Mn+1) in RAM is itself stored as (Y). Thus, the stored data [representing pattern (f)] at this initial address is used as a new initial address to bring flag logically low. When stitch data of (i) at said initial address [representing pattern (f)] is read out the stitch data of (i) is stored at RAM location (Mn+2) since it corresponds to a B-region, and when stitch data of (j) is similarly stored at RAM location (Mn+3), repeating signal RET is subsequently read out. Since flag NX is now high address (Y) is incremented in order to read out and store unit pattern (b), and this incremented address (Y) is then used as an initial address. Flag NX is brought low to read out stitch data of (b) and to store it at RAM location (Mn+4). The subsequent RAM address contains repeating signal RET, and since flag NX is low, repeating signal RET is stored at RAM location (Mn+5). Thus a table shown in FIG. 6 is created in RAM and pattern in FIG. 3-h is repeatedly stitched in the same manner as was discussed in connected with FIG. 5. Although the pattern (f) in FIG. 3-h here intervenes between unit patterns (a), (c) and (b), it may be positioned last. In this latter case, it is sufficient to store a repeating signal RET after stitch data of (i), (j) and RET, which last is the initial address of the code representing pattern (f). Since flag NX is high while repeating signal RET is read out, Y is incremented. When the former repeating signal RET is read out, flag NX is low and signal RET is, therefore, stored in RAM. It is, therefore, possible to form a pattern with pattern (f) last.

Since each of the unit patterns for composing the pattern in FIG. 3-g can be read out from the same location in ROM in order to produce the pattern in FIG. 3-h, utilization of space in ROM is increased. It is thus possible to form more patterns using a smaller ROM and pattern control is easy. Data stored in ROM need not be limited to the pattern formed by the signals controlling needle swing amplitude and fabric feed, and could be machine control signals utilized to produce more complicated patterns by moving and controlling an embroidering frame, to thereby enable one to combine far greater numbers of unit patterns.

It will be understood that each of the elements described above, or two or more together, may also find a useful application in other types of constructions differing from the types described above.

While the invention has been illustrated and described as embodied in a method of storing stitch data in and producing stitches from an electronic sewing machine, is it not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of producing stitch data from which different complete patterns may be sewn by an electronic sewing machine, the method being designed to avoid wasted space in a read-only memory contained within the sewing machine by avoiding repetitious storage of stitch data therein, comprising the steps of:
    dividing each of the different complete patterns to be sewn into individual unit patterns, which can be selectively combined to form at least one complete pattern;
    storing stitch data characteristic of the unit patterns in a read-only memory;
    selecting one of the complete patterns to be sewn by actuating a pattern selecting switch;
    ascertaining via a central processing unit which unit patterns are required for sewing the selected complete pattern;
    ascertaining via the central processing unit an order in which such required unit patterns should be executed in sewing the selected complete pattern;
    using the central processing unit to read stitch data characteristic of such required unit patterns into a random-access memory in said order; and
    using the central processing unit to read stitch data out of the random-access memory in said order.

2. The method defined by claim 1, wherein the step of dividing all patterns to be sewn into individual unit patterns includes the step of subdividing all unit patterns into: first groups which contain common unit patterns, which common unit patterns are required in order to sew more than one pattern; and second groups which contain non-common unit patterns, which non-common unit patterns are required in order to sew exactly one stitch.

3. The method defined by claim 1, wherein the step of ascertaining an order in which such unit patterns should be executed in order to sew the pattern is performed in the central processing unit.

* * * * *